UNITED STATES PATENT OFFICE.

FREDRICK DIFFANY, OF NEWARK, NEW JERSEY.

IMPROVEMENT IN TRANSPARENT FLUID COMPOUNDS FOR ENGRAVING PURPOSES.

Specification forming part of Letters Patent No. 152,978, dated July 14, 1874; application filed May 16, 1874.

*To all whom it may concern:*

Be it known that I, FREDRICK DIFFANY, of Newark, in the county of Essex and State of New Jersey, have invented a new and Improved Transparent Fluid Compound for Engraving Purposes, of which the following is a specification:

The object of this invention is to produce a transparent fluid compound of the consistency of ordinary writing-ink, which will adhere to a metal surface without any previous preparation. The said compound, when dry, will resist the action of acids, and also that of the sand-blast.

This transparent fluid compound is specially adapted when a large surface is required to be cut away, such as in bracelets, watch-cases, &c., for example. When it is desired to ornament a bracelet I draw the pattern with my compound and cover such portions as may require to be left untouched by the action of acids or sand-blast. The band or piece of metal thus prepared is set aside for a few hours until the compound stiffens, when it is ready to be treated with the sand-blast, which will rapidly cut away all such parts left uncovered by the said compound. The said compound does not become hard or brittle, but stiffens and keeps tough, so that the edges remain sharp. The fluid compound being transparent will enable the engraver to see his design, and thus detect any error or omission; before applying it to the sand-blast or action of acid he can readily correct the same. After taking the band or plate thus treated from the sand-blast, I clean off the compound with benzine, and then finish the cutting by hand, the labor of which being greatly reduced by the above-described process.

The compound is composed of the following ingredients: Benzine, ether, spirits of turpentine, rubber or gutta-percha, wax of shellac, dragon-blood, mastic gum, and alkanet, which will be mixed as follows, and in the proportions specified:

First, dissolve two and one-half grains of rubber or gutta-percha in twenty-nine grains of equal parts of benzine and turpentine; second, dissolve thirty grains of alkanet and sixty grains of ether, and then filter in a close vessel; third, I then take 5.60 grains of shellac, 3.75 grains of dragon-blood, 7.50 grains of mastic gum, and dissolve them in solution No. 2 and decant. I then mix the whole and the solution is ready for use.

I do not limit myself to the exclusive application of the above-described compounds for metals, as it may be used on stone, glass, &c., with an equally good result.

Having thus described my invention, I claim as new and desire to secure by Letters Patent—

A transparent fluid compound for engraving purposes, consisting of benzine, ether, spirits of turpentine, india-rubber, shellac, dragon-blood, mastic gum, and alkanet, combined in and about the proportions substantially as herein set forth and described.

FREDRICK DIFFANY.

Witnesses:
T. B. MOSHER,
CHARLES H. NASH.